United States Patent [19]

Yamasaki et al.

[11] Patent Number: 4,868,531

[45] Date of Patent: Sep. 19, 1989

[54] SUPERCONDUCTING MAGNETIC APPARATUS

[75] Inventors: Akinori Yamasaki; Sigenori Kuroda; Tatsuya Oue, all of Hyogo, Japan

[73] Assignee: Mitsubishi Denki Kabushiki Kaisha, Japan

[21] Appl. No.: 278,178

[22] Filed: Nov. 30, 1988

[30] Foreign Application Priority Data

Nov. 30, 1987 [JP] Japan ............................... 62-302117

[51] Int. Cl.$^{4}$ ............................................... H01G 7/22

[52] U.S. Cl. .................................... 335/216; 174/15.4

[58] Field of Search .............. 335/216; 174/15.4, 15.5, 174/125.1; 505/1

[56] References Cited

U.S. PATENT DOCUMENTS

| | | | |
|---|---|---|---|
| 4,625,193 | 11/1986 | Purcell | 335/216 |
| 4,695,675 | 9/1987 | Yamamoto | 174/15.4 |
| 4,754,249 | 6/1988 | Yamamoto et al. | 174/15.4 |

*Primary Examiner*—George Harris

*Attorney, Agent, or Firm*—Leydig, Voit & Mayer

[57] ABSTRACT

In a superconducting magnet apparatus comprising a liquid helium container accommodating a superconducting magnet in liquid helium and a vacuum insulating vessel surrounding the liquid helium container via a vacuum layer, the improvement wherein power supply leads inserted into a wiring tube fitted through the vacuum insulation vessel and the liquid helium container are formed of a superconductor having a critical temperature not lower than the temperature of liquid nitrogen.

2 Claims, 2 Drawing Sheets

SUPERCONDUCTING MAGNETIC APPARATUS

BACKGROUND OF THE INVENTION

The present invention relates to a superconducting magnet apparatus, more particularly, to leads for supplying power to a superconducting coil in a liquid helium container through said container and a surrounding vacuum insulation vessel.

FIG. 3 is a longitudinal section showing the upper part of a prior art superconducting magnet apparatus. The respective numerals in the figure denote the following: 1, superconducting coil; 2, liquid helium in which the superconducting coil 1 is submerged to be cooled to cryogenic temperature; 3, a liquid helium container for accommodating the superconducting coil 1 and the liquid helium 2; 4, a vacuum insulation vessel for thermally insulating the liquid helium container 3 by providing a vacuum layer around it; 5, a heat shielding plate provided between the liquid helium container 3 and the vacuum insulation vessel 4; 6, a wiring tube penetrating through the liquid helium container 3 and the vacuum insulation vessel 4; 7, power supply leads inserted into the wiring tube 6, which are formed of a hollow normal conductor; 8, a flange for assisting in the mounting of the power supply leads 7; 9, a connector to which the power supply leads 7 are connected; 10, a power source for exciting the superconducting coil 1; 11, an inlet for allowing helium gas vaporized from the liquid helium 2 to flow into the wiring tube 6, 12, a discharge port through which the helium gas that has flown through the inlet 11 is released into air atmosphere; 13, an inlet for allowing part of the helium gas flowing into the wiring tube 6 through the inlet 11 to flow into the hollow power supply leads 7; and 14, an outlet through which the helium gas flown through the inlet 13 is released into the wiring tube 6.

FIG. 4 is a cross section of FIG. 3 taken along line IV—IV; *7a* in FIG. 4 denotes a power supply lead on the negative side; *7b* denotes a power supply lead on the positive side; and *6a* and *7c* denote channels for the passage of helium gas vaporized from the liquid helium 2.

In the prior art superconducting magnet apparatus having the construction described above, the superconducting coil 1 in the liquid helium container 3 is cooled with liquid helium 2 to the cryogenic temperature at which it becomes superconductive. In order to excite (magnetize) or demagnetize the superconducting coil 1, the power supply leads 7 are connected to the connector 9 through the wiring tube 6, and the connector 9 is further connected to the external power source 10 for current application. After excitation or demagnetization is completed, the leads 7 are removed so as to prevent external heat from transmitting to the liquid helium container 3 through the leads 7.

Since the power supply leads 7 are formed of a hollow normal conductor, when current is applied for excitation or demagnetization purposes, the current flowing through the normal conductor will cause a resistance loss expressed by $I^2R$. Since cryogenic helium gas vaporized in the liquid helium container 3 flows through channels *6a* and *7c* shown in FIG. 4, part of the heat resulting from the resistance loss is dissipated into the helium gas which is released into air atmosphere through the outlet 12. The remainder of the heat is conducted from the leads 7 through the connector 9 to the liquid helium container 3, thereby promoting the evaporation of liquid helium 2.

As described above, the prior art superconducting magnet apparatus which employs a normal conductor in the power supply leads suffers the problem of the development of resistance loss in both excitation and demagnetization modes, which leads to accelerated consumption of liquid helium 2 on account of heat penetration into the liquid helium container 3.

SUMMARY OF THE INVENTION

The present invention has been accomplished in order to solve the aforementioned problems of the prior art. An object, therefore, of the present invention is to provide a superconducting magnet apparatus that consumes a smaller amount of liquid helium by eliminating the resistance loss occurring in excitation or demagnetization modes, thereby reducing heat penetration into the liquid helium container.

The above-stated object of the present invention is attained by a superconducting magnet apparatus in which power supply leads are formed of a high Tc superconductor, or a superconductor having a critical temperature not lower than the temperature of liquid nitrogen.

The superconducting magnet apparatus of the present invention uses a high Tc superconductor in power supply leads. This offers the advantage that resistance loss will not occur when the superconducting magnet is excited or demagnetized. Therefore, this apparatus will not suffer from heat penetration into the liquid helium container due to the resistance loss occurring in the power supply leads, thereby reducing the consumption of liquid helium during excitation or demagnetization of the superconducting magnet.

DETAILED DESCRIPTION OF THE INVENTION

An embodiment of the present invention will be described hereinafter with reference to FIGS. 1 and 2.

Figure 1:
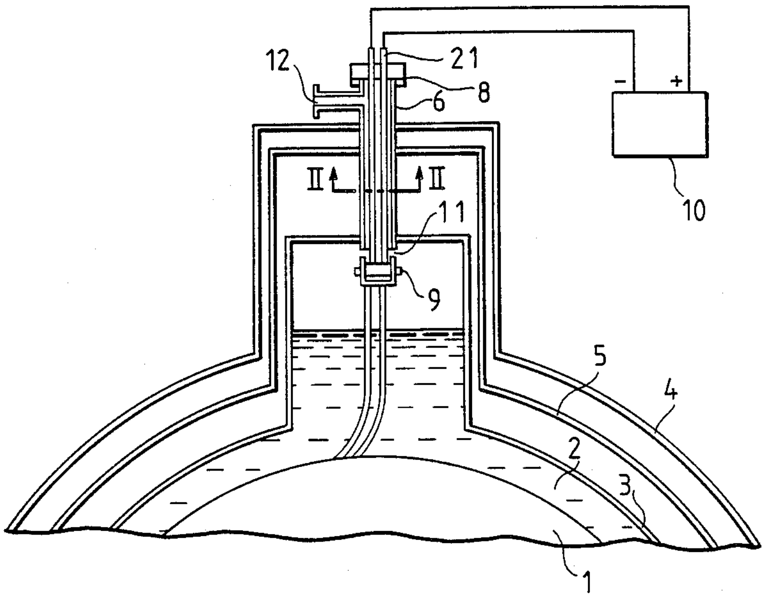
FIG. 1 is a longitudinal section showing the essential part of a superconducting magnet apparatus according to one embodiment of the present invention.
Figure 3:
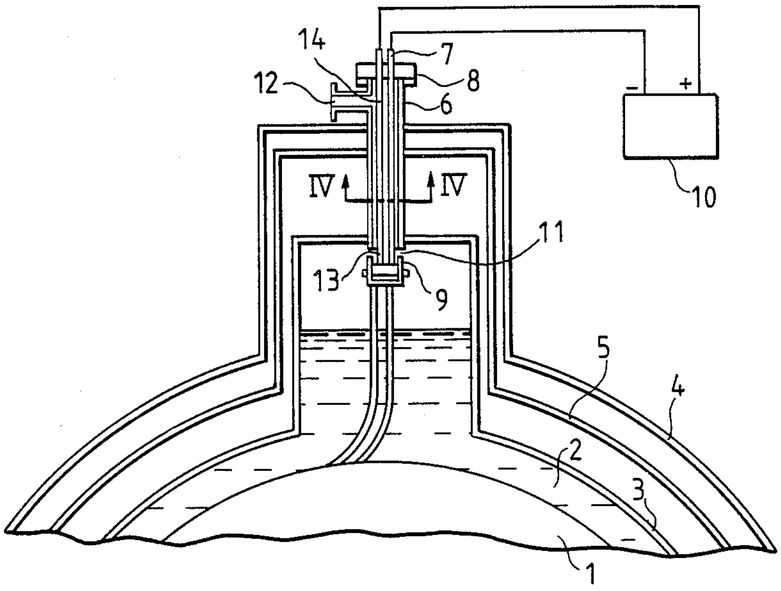
FIG. 3 PRIOR ART
FIG. 3 is a longitudinal section showing the essential part of a prior art superconducting magnet apparatus.
Figure 4:
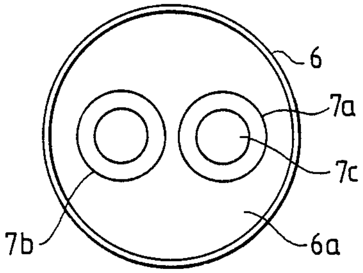
FIG. 4 PRIOR ART
FIG. 4 a cross section of FIG. 3 taken along line IV—IV.

FIG. 1 is a longitudinal section showing the upper part of a superconducting magnet apparatus according to one embodiment of the present invention. FIG. 2 is a cross section of FIG. 1 taken along line II—II. In FIG. 1, numeral 21 designates power supply leads that are formed of a high Tc superconductor typically based on ceramics. Unlike the power supply leads used in the prior art apparatus, the leads 21 are solid instead of being hollow. Numerals **21*a* and 21*b* in FIG. 2 denote power supply leads on negative and positive sides, respectively. The components identified by numerals 1–6, 8–12** and *6a* are the same as those which are indicated by like numerals in FIGS. 3 and 4 in connection with the prior art apparatus.

The operation of the apparatus according to the embodiment under discussion will be described.

Below the wiring tube 6 is provided liquid helium 2 at 4.2 K, so that the temperature of this portion is held at 4.2 K. The upper portion of the wiring tube 6 is held at the temperature of the heat shield which is 77 K. Helium gas having a temperature of 4.2 K which is vaporized from liquid helium 2 flows upward through the wiring tube 6, so that the helium gas channel 6a is held below the temperature of liquid nitrogen.

The power supply leads 21 are formed of a high Tc superconductor whose critical temperature is not lower than the temperature of liquid nitrogen. Since the helium gas channel 6a is held below the temperature of liquid nitrogen, the power supply leads 21 are held in the superconducting state. Therefore, the leads 21 are resistanceless and no resistance loss will occur when the superconducting magnet is excited or demagnetized. In the absence of resistance loss, no heat will conduct into the liquid helium container 3 and this contributes to reduced consumption of liquid helium 2. Another advantage that results from the absence of resistance loss due to the power supply leads 21 is that there is no need to employ a complicated lead structure, such as a hollow conductor, for cooling purposes and that a simple bar-shaped structure as shown in FIG. 2 will suffice.

Figure 2:
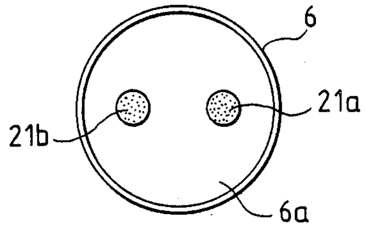
FIG. 2 is a cross section of FIG. 1 taken along line II—II.

The foregoing explanation of the embodiment shown in FIGS. 1 and 2 assumes that the power supply leads 21 have a circular cross section but this is not necessarily the case and leads of other cross sections such as rectangular will attain the same results.

As described on the foregoing pages, the power supply leads in the superconducting magnet apparatus of the present invention are formed of a high Tc superconductor, and this offers the advantage that the consumption of liquid helium due to resistance loss that occurs during excitation or demagnetization of the superconducting magnet is minimized. In addition, this apparatus is simple in structure and can be manufactured at low cost.

What is claimed is:

1. A superconducting magnet apparatus, comprising:
   a liquid helium container accommodating liquid helium and a superconducting magnet in said liquid helium;
   a vacuum insulating vessel surrounding said liquid helium container via a vacuum layer;
   a wiring tube provided through said vacuum insulation vessel and said liquid helium container; and
   power supply leads inserted into said wiring tube, said leads being formed of a superconductor having a critical temperature not lower than the temperature of liquid nitrogen.

2. A superconducting magnet apparatus according to claim 1, wherein said superconductor is a ceramic superconductor.

* * * * *